(12) United States Patent
Li et al.

(10) Patent No.: US 6,285,423 B1
(45) Date of Patent: Sep. 4, 2001

(54) POLARIZING BACK-LIGHTING SYSTEM FOR DIRECT VIEW LIQUID CRYSTAL DISPLAYS

(75) Inventors: Li Li, Orleans; Zhengda Pang, Gloucester, both of (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/449,957

(22) Filed: Nov. 26, 1999

Related U.S. Application Data
(60) Provisional application No. 60/110,166, filed on Nov. 27, 1998.

(51) Int. Cl.[7] ............ G02F 1/1335; G02B 5/30
(52) U.S. Cl. ............ 349/96; 349/62; 349/63; 349/117; 359/487
(58) Field of Search ............ 349/62, 63, 96, 349/98, 113, 117; 359/483, 591–595, 597, 598, 487; 385/11, 36; 362/19, 31, 318

(56) References Cited

U.S. PATENT DOCUMENTS

| | | | |
|---|---|---|---|
| 5,341,231 | * 8/1994 | Yamamoto et al. | 359/49 |
| 5,422,756 | * 6/1995 | Weber | 359/487 |
| 5,587,816 | * 12/1996 | Gunjima et al. | 349/62 |
| 5,712,694 | * 1/1998 | Taira et al. | 349/9 |
| 5,828,488 | * 10/1998 | Ouderkirk et al. | 359/487 |
| 5,912,762 | * 6/1999 | Li li | 359/352 |
| 6,108,059 | * 8/2000 | Yang | 349/65 |
| 6,147,725 | * 11/2000 | Yuuki et al. | 349/65 |

OTHER PUBLICATIONS 31.2 Reflective Polarizer Sheet on the Backlighting Unit – M. Susuki–IBM Japan Ltd.,–Kanagawa, Japan–SID 97 Digest pp. 813 to 816.*

22.2 A New Backlighting System with a Polarizer Light Pipe for Enchanced Light Output From LCDs –H. Tanase et al. – Sekisui Chemical, Kyoto, Japan –SID 97 Digest pp. 365 to 368.*

S32–3 Reflective Cholestric Polariser Improving the Light Yield of Back–and–Side Lighted Flat Panel Liquid Crystal Displays –D. J. Broer et al. –Philips Res. Labs. Eindhovan, The Netherlands Asia Displays 59 –pp. 735 to 738.*

7.2 New Application of Liquid Crystals and Liquid Crystal Polymers –D. Coates et al. –Merck Ltd., West Quay Road, Poole, Dorset –Euro Display 96 –pp. 91 to 94.*

9.4 A Single–Layer Super Broadband Reflective Polarizer I. Li et al. –Reveo, Inc., Hawthorne, New York –SID 96 Digest– pp. 111 to 113.*

* cited by examiner

*Primary Examiner*—William L. Sikes
*Assistant Examiner*—Tarifur R. Chowdhury
(74) *Attorney, Agent, or Firm*—Marks & Clerk

(57) ABSTRACT

A polarizing light source for providing polarized illumination over a two-dimensional surface has a slab-like light guide with an entrance face at one end thereof for admitting unpolarized light from a linear source, a planar front face for emitting polarized light, a planar back face, and an end face. A polarizing device is located on said back face for reflecting light of a first polarization and transmitting light of a second polarization at non-normal angles of incidence. The reflected light is directed in the light guide to the end face. A reflective arrangement under the polarizing device returns the transmitted light to the light guide in a direction substantially normal to the polarizing device such that it passes unaffected through the polarizing device for exit through the front face. A polarization converter on the end face changes the polarization of the reflected light and directs it into the reflective arrangement through the polarizing device as light of the second polarization for return to the light guide through the polarizing device in a direction substantially normal to the polarizing device such that it passes unaffected through the polarizing device from the reflective arrangement for exit through said front face.

31 Claims, 13 Drawing Sheets

POLARIZING BACK-LIGHTING SYSTEM FOR DIRECT VIEW LIQUID CRYSTAL DISPLAYS

Cross Referenced to Related Application

This application claims priority under 35 USC 119(e) from our US provisional application Ser. No. 60/110,166 filed on Nov. 27, 1998.

FIELD OF THE INVENTION

This invention relates to the field of optics, and more particularly to polarizing light sources and liquid crystal displays.

BACKGROUND OF THE INVENTION

Currently, most of liquid crystal displays (LCD) are based on the twisted nematic (TN) scheme that require the use of polarized light. A typical direct-view LCD panel consists of many optical components, such as a back lighting system, a liquid crystal panel with addressing electronics sandwiched between two plastic polarizers, a colour filter mosaic for forming full colour displays, etc. Each component has limited optical efficiency. For example, the plastic polarizers absorb at least 50% of light. The addressing electronics has a certain size aperture that limits the amount of light passes through the liquid crystal cell. The colour filters absorb at least two thirds of the light. As a result, the efficiency of such directview liquid crystal panel is very low; only about 5% of total light is used.

In order to enhance the efficiency of the direct-view LCDs, several polarization recovering approaches have been proposed in the past. The first approach is based on the use of the Brewster angle effect to separate s- and p-polarized light, such as the art taught by M. F. Weber in the U.S. Pat. No. 5,422,756, by M. Suzuki in "Reflective polarizer sheet on the backlighting unit", SID'97 Digest, 813(1997), by H. Tanase et al in "A new backlighting system with a polarizer light pipe for enhanced light output from LCDs", SID'97 Digest, 365(1997). However, this approach suffers a poor angular performance and low extinction ratios due to the inherited property of the Brewster angle effect. As a result, the gain from converting unwanted polarization to the wanted polarization is partially lost because of the poor performance of the polarizers. No practical system based on this approach is available for the direct-view LCD market.

The second approach is to use reflective cholesteric liquid crystal polarizers, such as the art taught by D. J. Broer et al in "Reflective cholesteric polarizer improving the light yield of back-and side-Lighted flat panel liquid crystal displays", SID'95 Asia Display Digest, 735(1995), by D. Coates et al in "New applications of liquid crystals and liquid crystal polymers", SID'96 Eurodisplay Digest, 91(1996), and by L. Li et al in "A single-layer super broadband reflective polarizer", SID'96 Digest, 111 (1996). Although such polarizers may have a broad band, their extinction ratios are low, about 10:1 to 20:1. A second "cleanup" polarizer is required to absorb the unwanted polarized light and to bring the extinction ratio to a desired level greater than 100:1. In addition, the performance of such polarizers is sensitive to temperature and UV radiation.

The third approach is to use co-extruded reflective plastic polarizer, such as the art taught by A. J. Ouderkirk et al in "Reflective polarizer display," U.S. Pat. No. 5,828,488. The polarizer consists of a few hundred to a few thousand stretched films made of two plastic materials. One material has birefringence due to the stretching and the other does not. At normal angle of incidence, light polarized in one direction passes because the refractive indices of the two materials are matched. Light polarized in the other direction sees a refractive index difference because of the birefringence. As a result, this polarized light is partially reflected. Its reflectance depends on the refractive index difference as well as the number of layers. Since the refractive index difference is rather small, in order to achieve high reflectance over a broad band of wavelengths, a large number of plastic films with different thicknesses are required. This polarizer is broad band and wide angle. One disadvantage of this approach is that the extinction ratio is small. Second, there is some light loss due to absorption by the films and scattering at layer interfaces.

Therefore, the objective of this research is to develop a high efficiency polarizing light source, more particularly a back-lighting system for direct-view LCDs.

SUMMARY OF THE INVENTION

According to the present invention there is provided a polarizing light source for providing polarized illumination over a two-dimensional surface, comprising a slab-like light guide having an entrance face at one end thereof for admitting unpolarized light from a linear source, a planar front face for emitting polarized light, a planar back face, and an end face; a polarizing device on said back face for reflecting light of a first polarization and transmitting light of a second polarization at non-normal angles of incidence, said reflected light being directed in said light guide to said end face; a reflective arrangement under said polarizing device for returning said transmitted light to said light guide in a direction substantially normal to said polarizing device such that it passes unaffected through said polarizing device for exit through said front face; and a polarization converter on said end face for changing the polarization of said reflected light and directing it into said reflective arrangement through said polarizing device as light of said second polarization for return to said light guide through said polarizing device in a direction substantially normal to said polarizing device such that it passes unaffected through said polarizing device from said reflective arrangement for exit through said front face.

The device in accordance with the principles of the invention employs both polarizations and therefore has substantially increased efficiency relative to the prior art.

Various forms of polarizing devices can be employed, including a thin film polarizing device based on interference and frustrated total internal reflection, or one employing metaldielectric films.

The reflective arrangement is typically in the form of a single prism or prism array with facets inclined so as to return the reflected rays in the normal direction. These rays are unaffected as they return through the polarizing device.

The invention also provides a method of providing polarized illumination over a two-dimensional surface, comprising the steps of directing light from a linear source through an entrance face into a slab-like light guide having a planar front face for emitting polarized light, a planar back face, and an end face; directing said light in said light guide at non-normal angles of incidence to a polarizing device on said back face for reflecting light of a first polarization and transmitting light of a second polarization such that said reflected light is directed in said light guide to said end face; returning said transmitted light to said light guide in a direction substantially normal to said polarizing device such that it passes unaffected through said polarizing device for exit through said front face; and changing the polarization of said reflected light striking said end face and directing the light with changed polarization through said polarizing device at a non-normal angle of incidence for return into said light guide through said polarizing device in a direction substantially normal to said polarizing device such that said light with changed polarization passes unaffected through said polarizing device for exit through said front face.

The invention still further provides a liquid crystal display comprising an addressable liquid crystal array; a polarizing layer in front of said liquid crystal array; a linear light source; a slab-like light guide having an entrance face at one end thereof for admitting unpolarized light from said linear light source, a planar front face for emitting polarized light toward said addressable liquid crystal array, a planar back face, and an end face; a polarizing device on said back face for reflecting light of a first polarization and transmitting light of a second polarization at non-normal angles of incidence, said reflected light being directed in said light guide to said end face; a reflective arrangement under said polarizing device for returning said transmitted light to said light guide in a direction substantially normal to said polarizing device such that it passes unaffected through said polarizing device for exit through said front face toward said addressable liquid crystal array; and a polarization converter on said end face for changing the polarization of said reflected light and directing it into said reflective arrangement through said polarizing device as light of said second polarization for return to said light guide through said polarizing device in a direction substantially normal to said polarizing device such that it passes unaffected through said polarizing device from said reflective arrangement for exit through said front face addressable liquid crystal array.

Another aspect of the invention provides a polarizing light source for providing polarized illumination, comprising a light guide having an entrance face at one end thereof for admitting unpolarized light, a planar front face for emitting polarized light, a planar back face, and an end face; a polarizing device on said back face for reflecting light of a first polarization and transmitting light of a second polarization at non-normal angles of incidence, said reflected light being directed in said light guide to said end face; a reflective arrangement under said polarizing device for returning said transmitted second polarized light to said light guide in a direction substantially normal to said polarizing device such that it passes unaffected through said polarizing device for exit through said front face; and a polarization converter on said end face for changing the polarization of said reflected light of said first polarization into light of said second polarization and directing it into said reflective arrangement through said polarizing device as light of said second polarization for return to said light guide through said polarizing device in a direction substantially normal to said polarizing device such that it passes unaffected through said polarizing device from said reflective arrangement for exit through said front face.

The light source can be any suitable source, such as a fluorescent tube or linear LED array.

BRIEF DESCRIPTIONS OF THE DRAWINGS

The invention will now be described in more detail, by way of example only, with reference to the accompanying drawings, in which.

DETAILED DESCRIPTION OF THE INVENTION

Figure 1A:
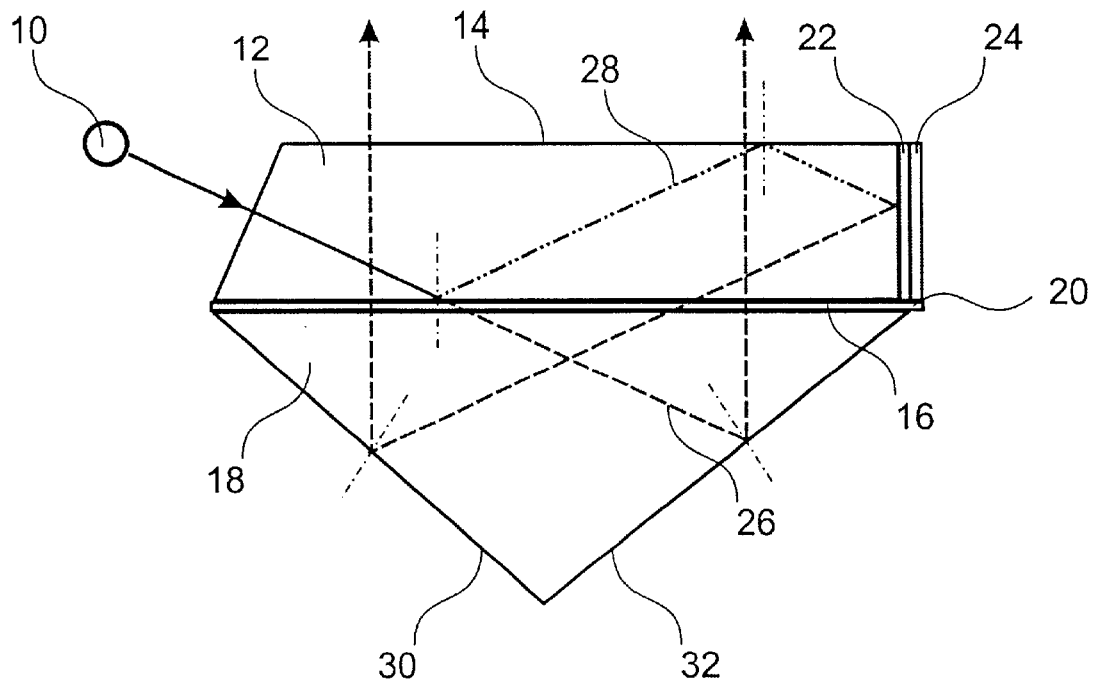
FIG. 1a is a cross-sectional view of the schematic and the first embodiment of the polarizing light source system having a single prism.
Figure 1B:
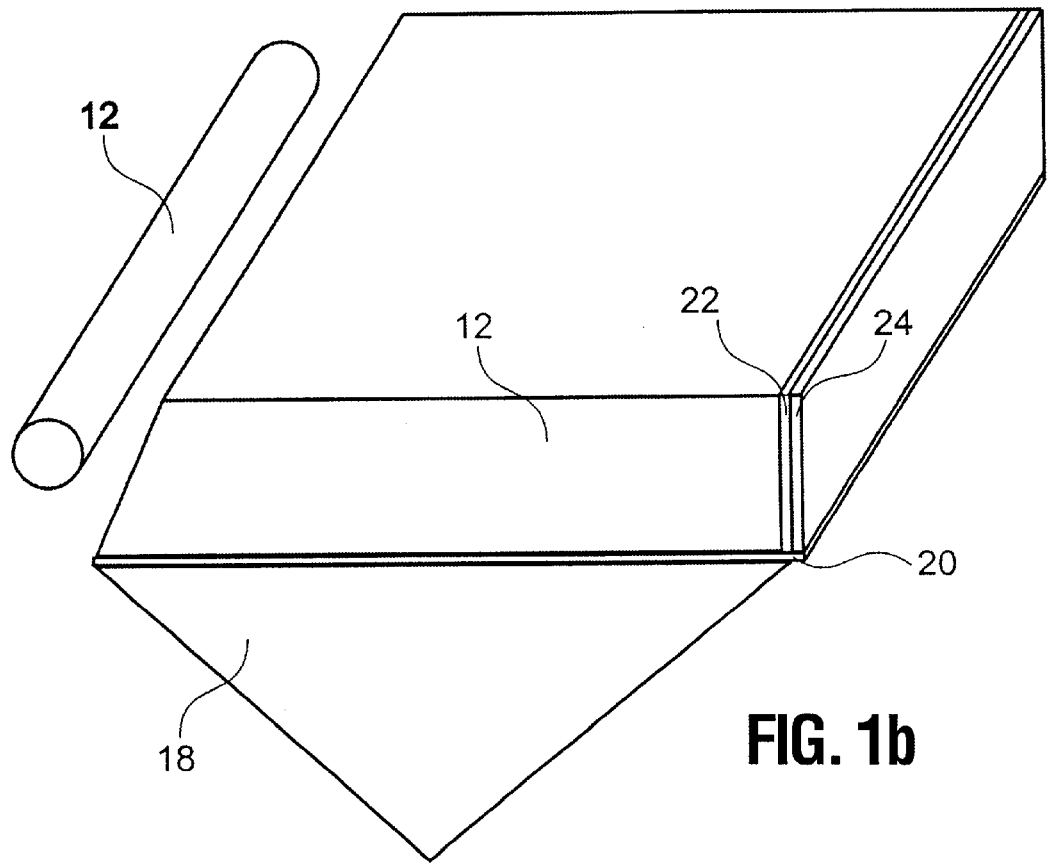
FIG. 1b is 3-D view of the schematic and the first embodiment of the polarizing light source system having a single prism.

The cross-sectional view of the schematic diagram of the polarizing light source system in accordance with the present invention is shown in FIG. 1a. A three-dimensional view is shown in FIG. 1b. The system consists of a light source 10, an optical light pipe or guide 12 having a bottom surface 16 and top surface 14, a prism 18 for directing light beam vertically upwards, a polarizing device 20 sandwiched between the optical pipe and the prism, a quarterwave plate 22 and a reflecting mirror 24 at the right end of the light pipe.

For simplicity in the description, the un-polarized light is always shown in solid line, the transmitted polarized light in dashed lines, the reflected polarized light in dotted line and the partially polarized light in small dotted lines. In addition, it is assumed that the polarizing device transmits p-polarized light and reflects s-polarized light. It is clear that without departing from the spirit of the present invention, the polarizing device can also reflect ppolarized light and transmit s-polarized, or reflect ordinary ray/extra-ordinary ray and transmit extra-ordinary/ordinary ray. Different types of polarizing devices in accordance with the present invention will be described in detail later.

In the polarizing light source system, the un-polarized light (solid line) from the light source 10 is incident upon the polarizing device at an oblique angle. The p-polarized light 26 (dashed line) is transmitted through the polarizing device and the s-polarized light 28 (dotted line) is reflected. The transmitted p-polarized light 26 reaches the bottom surfaces of the prism 18. The prism is designed such that the incident light at its bottom surfaces 30 and 32 will be vertically reflected either by total internal reflection because the angle of incidence is larger than the critical angle, or by depositing a highly reflective coating at these surfaces, such as aluminum or silver coatings. Since the polarizing device is an AR (anti reflective) coating at normal or small angles of incidence, most of the light is then transmitted through the polarizing device and finally exits from the surface 14 of the optical pipe. The exiting light consists of only p-polarized light.

For the reflected s-polarized light (dotted line) from the polarizing device, it is confined within the light-pipe. At the top surface 14 of the light pipe, it is reflected by total internal reflection because the angle of incidence is larger than the critical angle, at the bottom surface 16 of the light pipe, it is reflected by the polarizing device. Eventually it reaches the right end of the light pipe and is converted to p-polarized light (dashed line) by the polarization converter having the quarterwave plate and the mirror. As a result, the converted p-polarized light goes through a similar light pass as the original p-polarized light and finally exits from the top surface 14 of the light pipe. Therefore, most of the unpolarized light exits the light pipe as p-polarized. Very little light is lost. The system is a high efficiency polarizing light source.

Figure 2A:
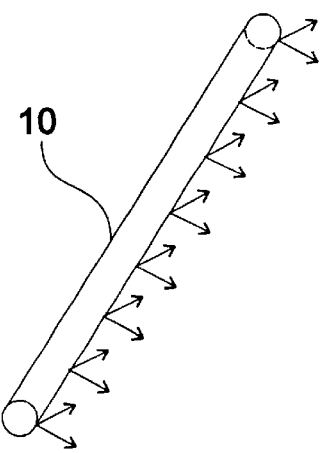
FIG. 2a is a 3-D view of a fluorescent light tube used in the present invention.
Figure 2B:
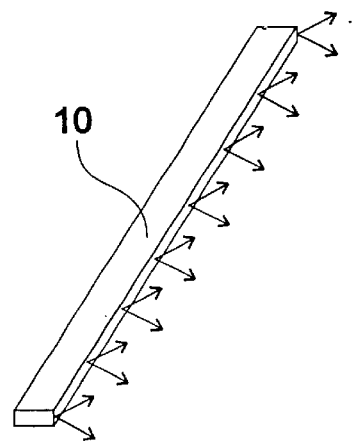
FIG. 2b is a 3-D view of a LED bar used in the present invention.
Figure 2C:
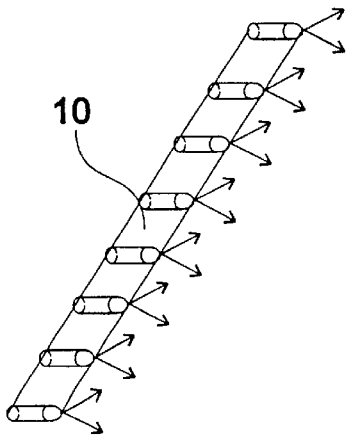
FIG. 2c is a 3-D view of a LED arrays used in the present invention.
Figure 2D:
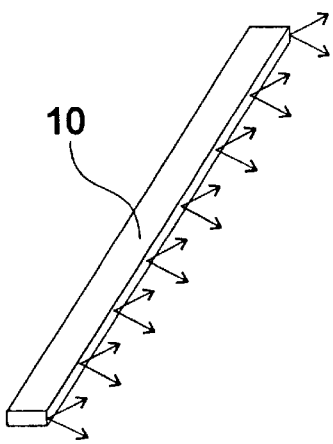
FIG. 2d is a 3-D view of a laser diode bar used in the present invention.
Figure 2E:
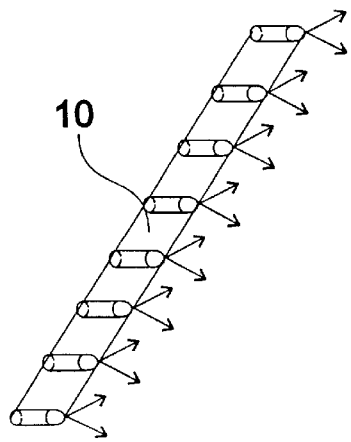
FIG. 2e is a 3-D view of a laser diode arrays used in the present invention.

The light source can be a fluorescent tube (FIG. 2a), a light emitting diode (LED) bar (FIG. 2b), an LED array with individual LEDs (FIG. 2c), a laser diode bar (FIG. 2d), a laser diode array with individual diodes (FIG. 2e), etc. Although the light emitting from the lasers could be polarized already, the polarizing light source using a laser is still desirable because it is a flat polarizing source. It is clear, without departure from the spirit of the present invention, other types of light source can also be used. For example, a unpolarized point source can be used which results in a linear polarized light output.

The quarterwave plate can be made of birefringent crystals for a narrow band light source such as a laser or a LED. If a broadband light source is used, a plastic retarder film or waveplate is preferred. The retarder film can consist of several stretched plastic layers which have birefringent properties and their optical axes are oriented differently to obtain a broad band retardation. Alternatively, liquid crystal waveplate can be used. For example, a conventional twisted nematic liquid crystal reflective display is actually a quarterwave plate in the visible region. In the present invention, the liquid crystal waveplate has a very simple structure, consists of a twisted liquid crystal layer sandwiched between two substrates, each with an alignment layer. No transparent electrode, addressing electronics and pixeltation are required.

Figure 3:
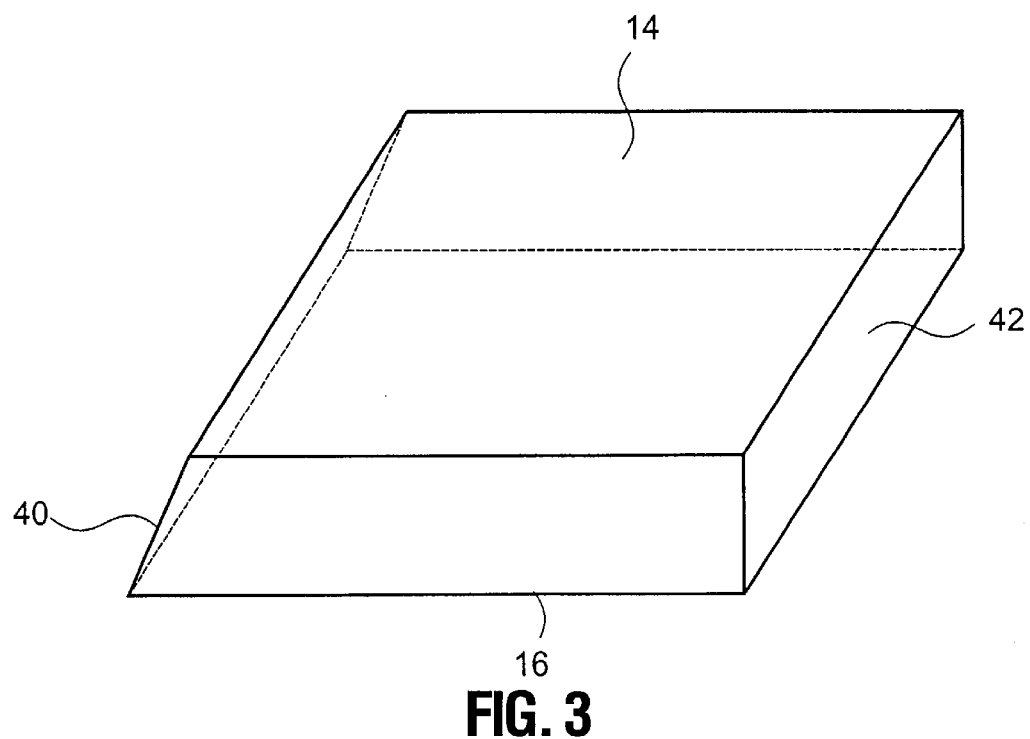
FIG. 3 is a 3-D view of the light pipe used in the present invention.
Figure 4A:
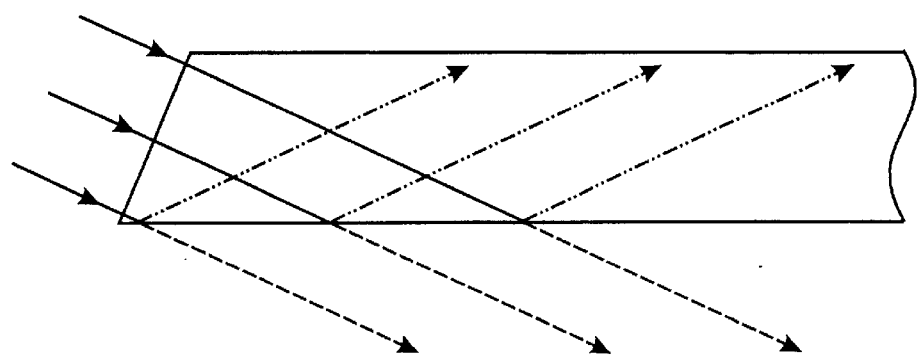
FIG. 4a shows one approach to couple light into the light pipe.
Figure 4B:
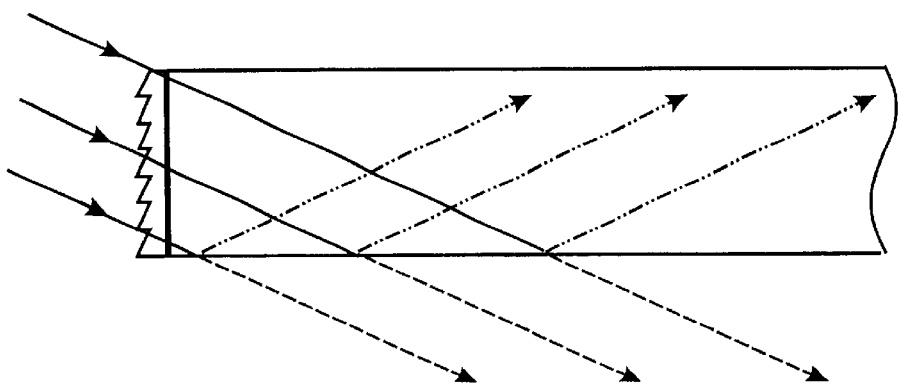
FIG. 4b shows another approach to couple light into the light pipe.

The optical pipe is made of glass, plastic, semiconductor or other transparent materials. It has four surfaces, the entrance surface 40, the bottom surface 16, the exiting surface 14 and the end-surface 42 (FIG. 3). The surface 40 and 14 are anti-reflection coated. The light from the light source is coupled into the optical pipe through the entrance surface 40 of the light pipe as shown in FIG. 4a. To reduce the bulkiness, the entrance can be made of the same material as the optical pipe but in an array or micro-prism form as shown in FIG. 4b.

Figure 5:
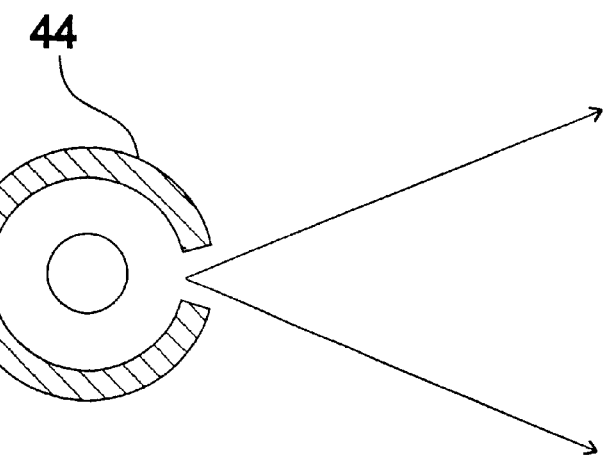
FIG. 5 shows a fluorescent tube with a reflective mirror.
Figure 6A:
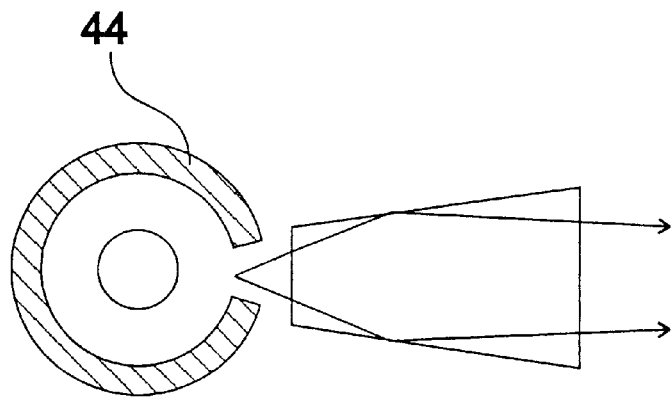
FIG. 6a shows one approach to collimate the light from the light source.
Figure 6B:
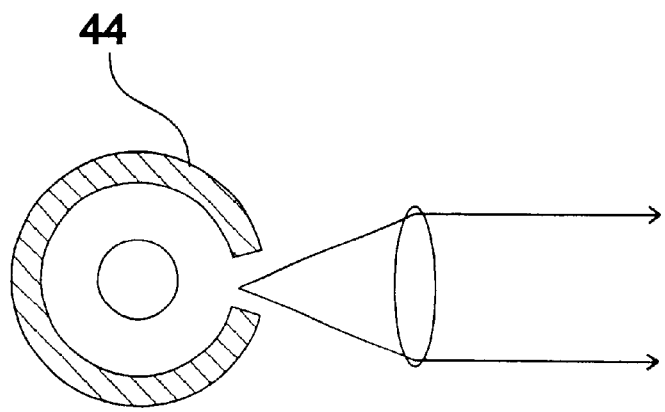
FIG. 6b shows another approach to collimate the light from the light source.

To improve the light collection efficiency and to limit the divergent angle of the light, a reflective mirror 44 having a small opening can be used (FIG. 5). The mirror reflects light emitting from the opposite direction towards the opening. In addition, if necessary, the divergent angle can be further reduced by using a collimating light pipe (FIG. 6a) and or a cylindrical lens (FIG. 6b). Although only fluorescent tube is shown in FIGS. 4a and 4b, the collimating schemes apply to other light sources described above as well.

Figure 7A:
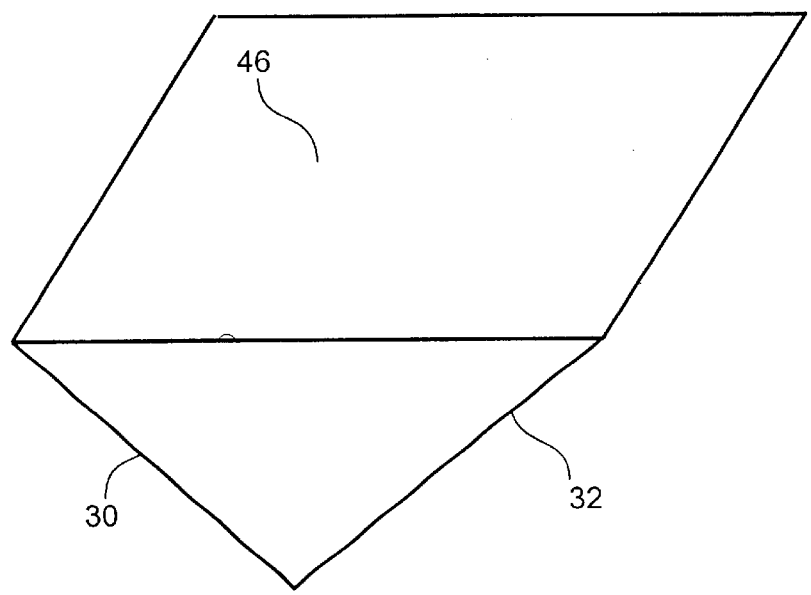
FIG. 7a is a 3-D view of a single prism used in the present invention.
Figure 7B:
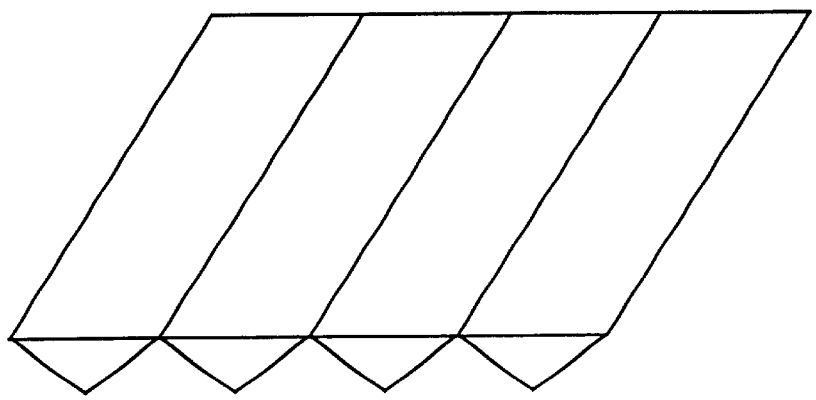
FIG. 7b is a 3-D view of a prism arrays used in the present invention.
Figure 7C:
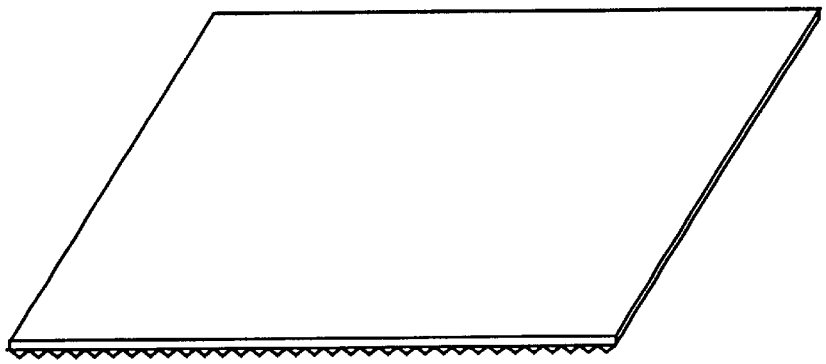
FIG. 7c is a 3-D view of a micro-prism sheet used in the present invention.

The prism is also made of glass, plastic, semiconductor and or transparent materials. It can be the same material as that of the optical pipe or of a material having a similar refractive index. It has three surfaces, the top surface 46, the reflecting surface 30 and 32 (FIG. 7a). Light incident at surface 30 and 32 from the top are reflected by either by ensuring the angle of incidence is larger than the critical angle or providing a highly reflective coating, such as aluminum, silver coated onto these surfaces. To reduce the bulkiness of the prism, a prism arrays or micro-prism sheet are used instead as shown in FIGS. 7b and 7c. A micro-prism sheet significantly reduces the thickness of the whole system.

The polarizing device is designed to have a special property that it acts like a polarizing beam-splitter at an oblique angle of incidence to separate the two orthogonal polarized light beams by reflecting one polarization and transmitting the other polarization. In addition, at normal or small angles of incidence, it acts like an anti-reflection coating, it transmits light. In the present invention, the light pipe or the prism can act as the substrates of the polarizing device. Polarizing devices in used in the present invention First type of the polarizing devices The first type of polarizing device can be used in the present invention is the thin-film polarizing device disclosed in the U.S. Pat. No. 5,912,762 by Li Li et al. It is based on the effects of frustrated total internal reflection and light interference in thin films.

Figure 8A:
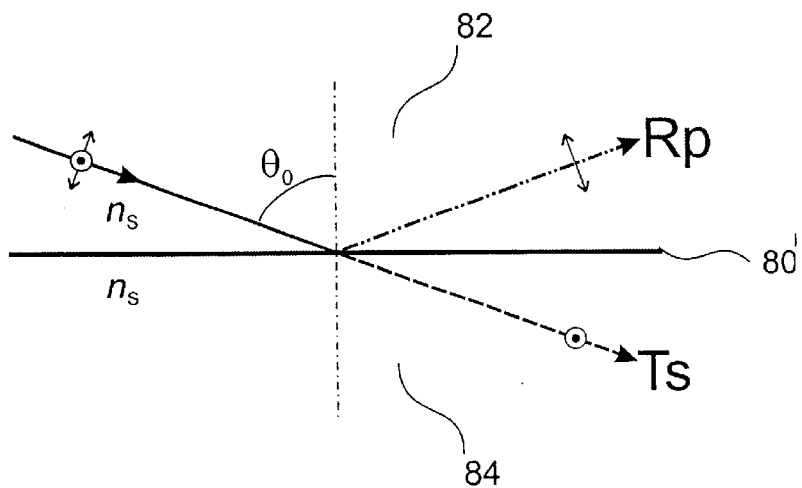
FIG. 8a shows the first type polarizing device having an all-dielectric PBS used in the present invention.
Figure 8B:
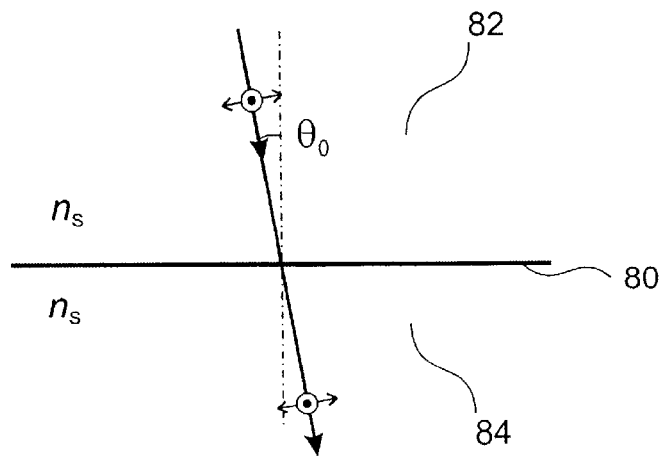
FIG. 8b shows that the first type polarizing device is an AR coating at normal or small angles of incidence.
Figure 8C:
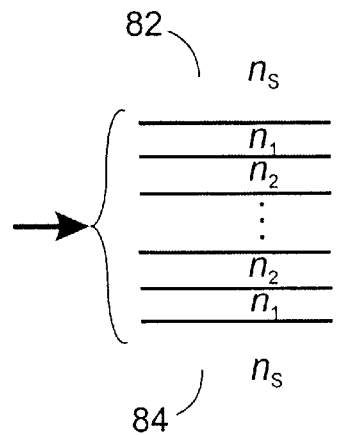
FIG. 8c shows the layer structure of the first polarizing device.

The schematic diagram of the polarizing device is shown in FIGS. 8a, 8b and 8c. The polarizing coating 80 is sandwiched between two substrates 82 and 84 having refractive index of $n_S$ (FIG. 8a). The substrates can be made of glass, plastic, semiconductor or other transparent materials. The polarizing coating consists of low and high index layers having refractive indices of $n_1$ and $n_2$ respectively (FIG. 8b). The low index coating materials can be $SiO_2$, $MgF_2$, $Al_2O_3$, etc., and the high index materials can be made of $HaO_2$, $ZrO_2$, $TiO_2$, $Ta_2O_5$, $Nb_2O_5$, ZnSe, Si, Ge, etc. The refractive index of the substrate is selected to be larger than that of the low-index material. The incident angle $\theta_0$ is larger than the critical angle for the low index layers. By correctly selecting of thickness of each individual layer, a non-absorbing, broad-band, wide-angle, high extinction ratios thin film polarizing beam-splitter can be obtained.

When un-polarized light (solid line) incident at the polarizing coating (FIG. 8a), the transmitted light (dashed line) is s-polarized light while the reflected light (dotted line) is ppolarized.

Figure 9:
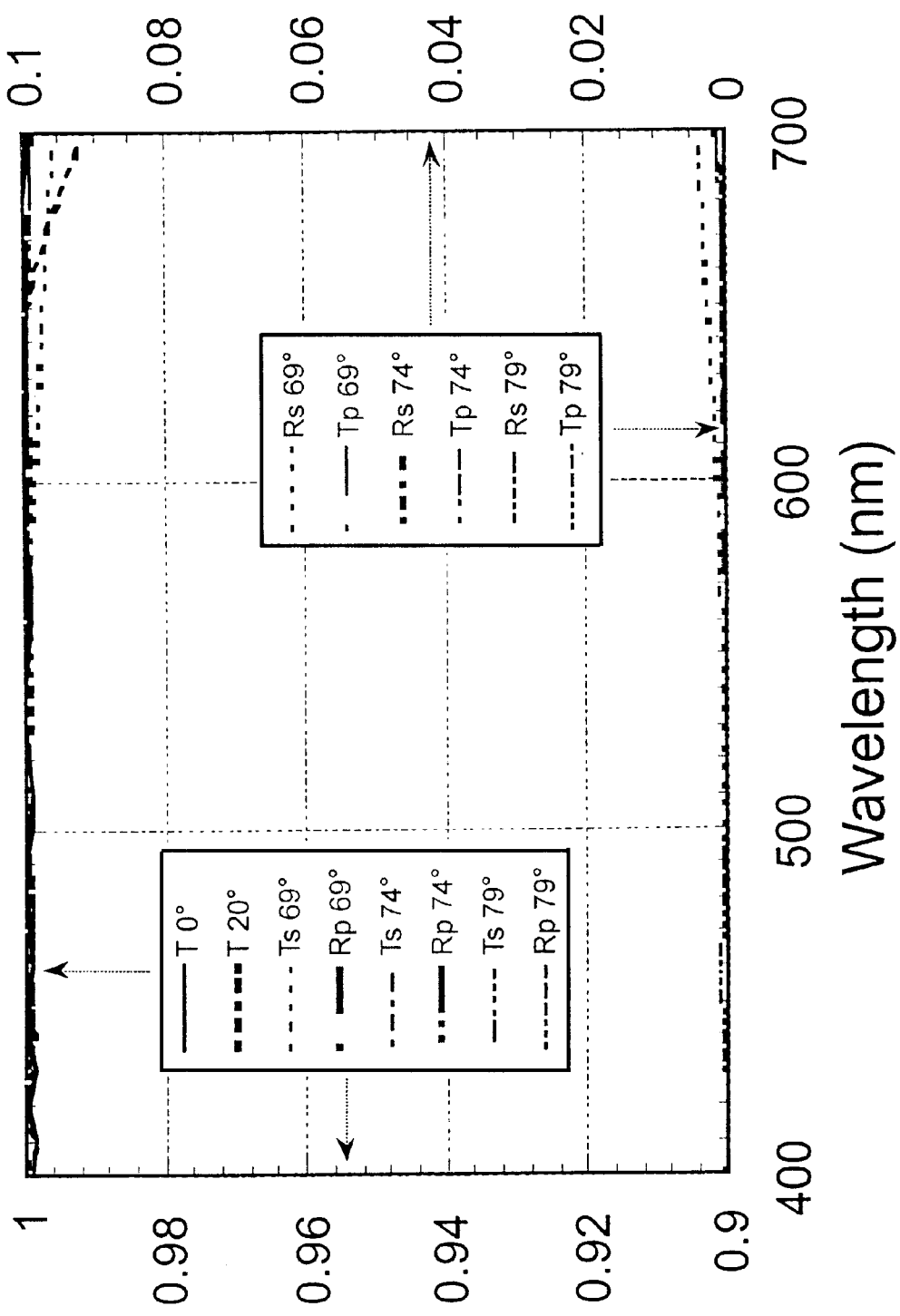
FIG. 9 shows the calculated transmittance and reflectance at different angles of incidence of the first type polarizing device in accordance with the present invention.

Unlike the disclosure of U.S. Pat. No. 5,912,762, the polarizing device in accordance with the present invention also acts an anti reflective coating at normal or small angles of incidence and it transmits all light regardless of polarization (FIG. 8c). One such polarizing device has been designed for the visible spectrum. It consists of 27 layers of 1.38/2.35 materials deposited on polycarbonate substrates. The calculated transmittance and reflectance of the polarizing device at different angles of incidence for both s- and p-polarized light are shown in FIG. 9. It is clear that the polarizing device has a very good extinction ratio over a broad range of angles of incidence (69°–79° in substrate, ±8° in air). The transmittance between 0° and 20° angles of incidence is high too, close to 100%.

Second Type of the Polarizing Devices

The second type of polarizing device can be used in the present invention is a simple metal-dielectric thin film polarizing device, which is described in our co-pending patent application derived from US provisional application Ser. No. 60/112,970, which is herein incorporated by reference. It is based on light interference in thin dielectric and special metal films at oblique angles of incidence.

Figure 10A:
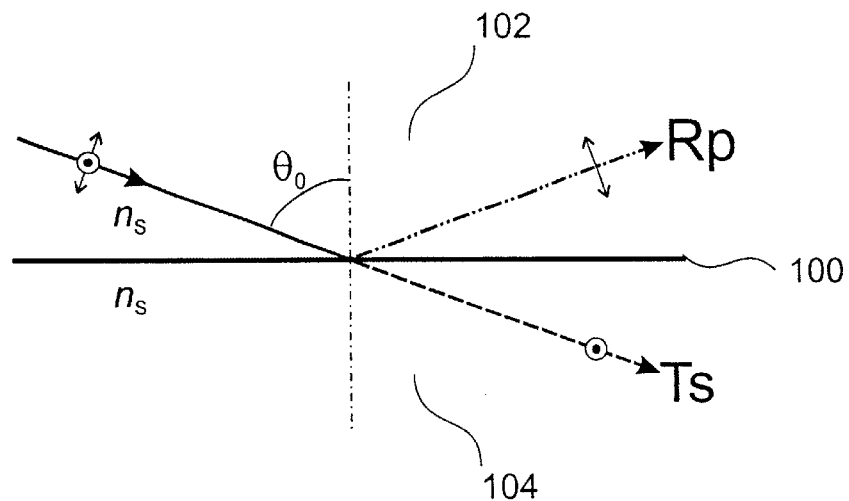
FIG. 10a shows the second type polarizing device having a metal-dielectric PBS used in the present invention.
Figure 10B:
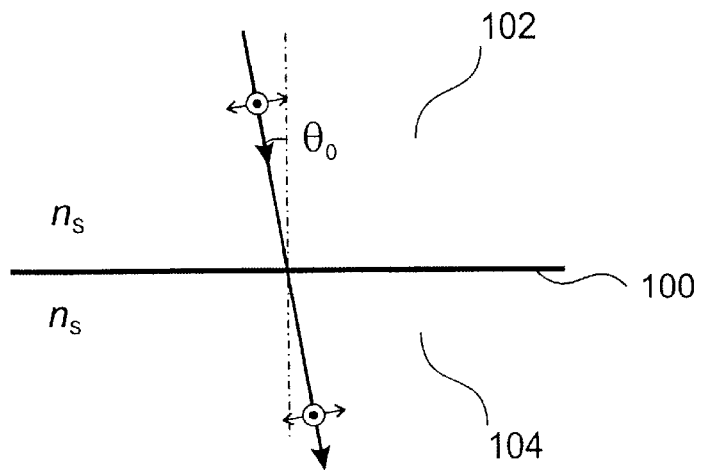
FIG. 10b shows that the second type polarizing device is an AR coating at normal or small angles of incidence.
Figure 10C:
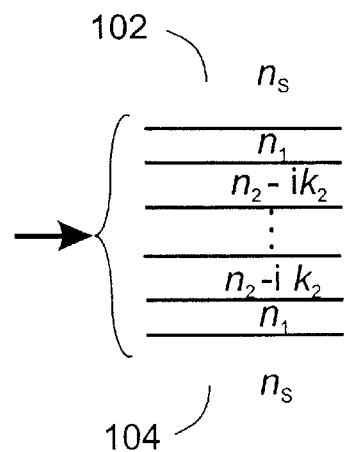
FIG. 10c shows the layer structure of the second polarizing device.

The schematic diagram of the polarizing device is shown in FIGS. 10a, 10b and 10c. The polarizing coating 100 is sandwiched between two substrates 102 and 104 having refractive index of $n_S$ (FIG. 10a). The substrates can be made of glass, plastic, semiconductor or other transparent materials. The polarizing coating consists of dielectric and metal layers having refractive indices of $n_1$ and $n_2$—$ik_2$ respectively (FIG. 10c). The dielectric materials can be selected from $SiO_2$, $Al_2O_3$, $MgF_2$, etc. The special metals can be selected from silver, gold, copper or other materials where the real refractive index n is small compared to the extinction coefficient k. In this polarizing device, the refractive index of the substrate $n_S$ is larger than that of the dielectric layer. By correctly selecting of thickness of each individual layer, a broad-band, wide-angle polarizing beam-splitter can be obtained. The extinction ratios of the polarizing device are also reasonably good.

When un-polarized light (solid line) incident at the polarizing coating, the transmitted light (dashed line) is p-polarized light while the reflected light (dotted line) is s-polarized.

Figure 11:
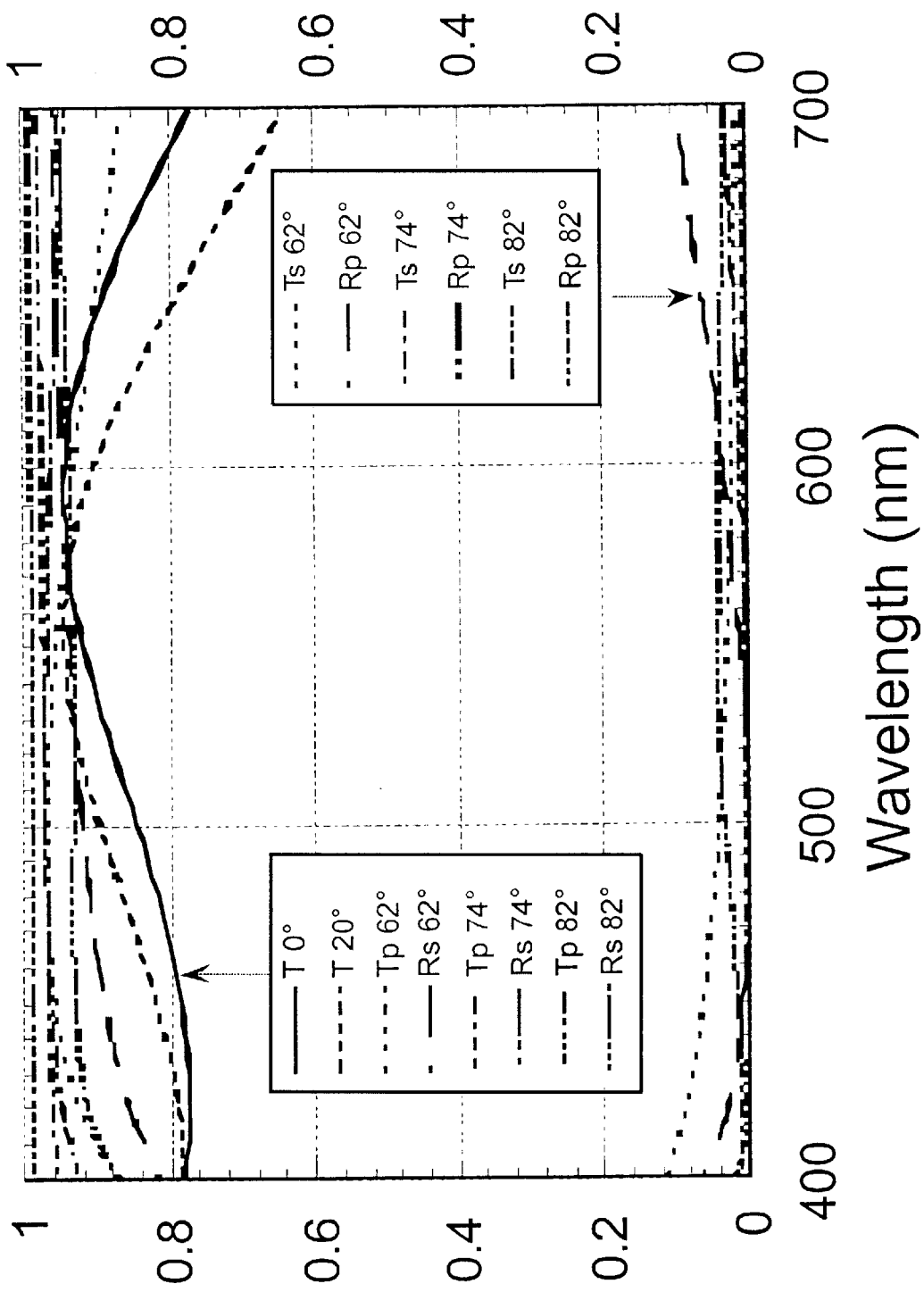
FIG. 11 shows the calculated transmittance and reflectance at different angles of incidence of the second type polarizing device in accordance with the present invention.

Such a metal-dielectric polarizing device can also be designed to act like an anit-reflective coating at normal or small angles of incidence (FIG. 10b). The biggest advantage of this type polarizing devices is its simple structure. It can consist as few as 3–7 layers. One of such polarizing device has been designed in accordance with the present invention. It consists of five layers of silver and $SiO_2$ layers on acrylic substrates. FIG. 11 shows the calculated transmittance and reflectance at different angles of incidence for both sand p-polarized light. Its working angle is between 66°–82° in substrate (±12° in air) in the visible region. Overall, there is 1–5% absorption in this thin film PBS due to the use of metal films. Although its extinction ratio is not high compared to the all-dielectric polarizing device, this metal-dielectric polarizing device can be produced in large scale at low cost because of its simple structure.

Third Type of the Polarizing Devices

The third type of polarizing device that can be used in the present invention is a polarizing beam-splitter based on a liquid crystal layer sandwiched between two transparent substrates.

Figure 12A:
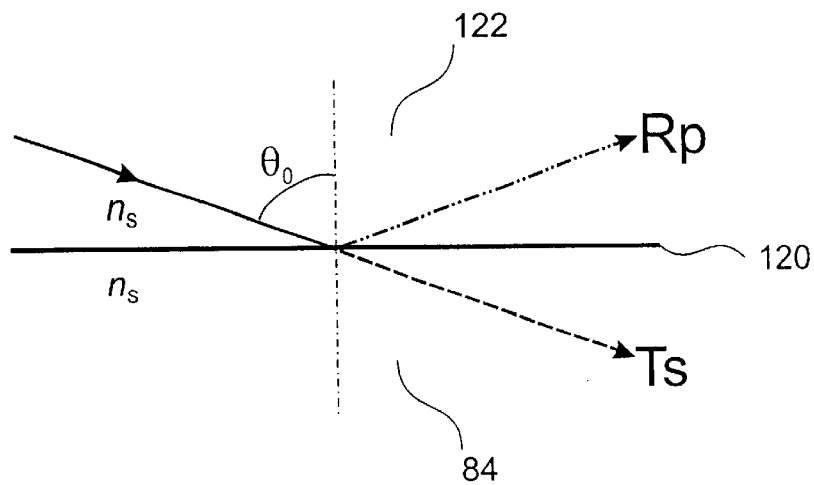
FIG. 12a shows the third type polarizing device having a liquid crystal layer used in the present invention.
Figure 12B:
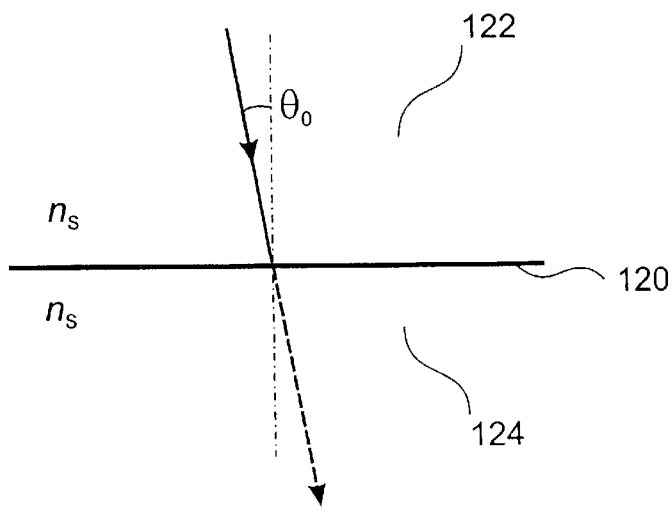
FIG. 12b shows that the third type polarizing device is an AR coating at normal or small angles of incidence.
Figure 12C:
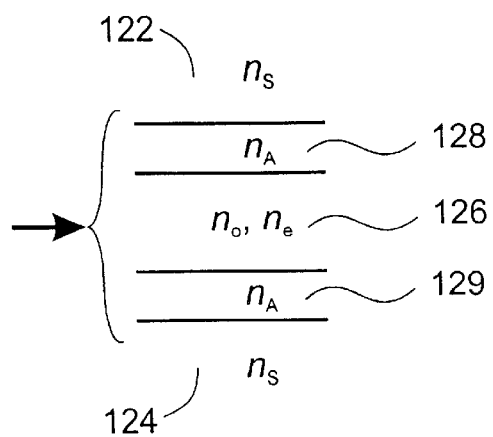
FIG. 12c shows the layer structure of the third polarizing device.

A schematic diagram of such polarizing device is shown in FIGS. 12a, 12b and 12c. It consists of two substrates 122 and 124 having refractive index $n_S$, and a polarizing element 10. The polarizing element 120 consists of a liquid crystal layer 126 and two alignment layers 128 and 129 for the liquid crystal layer (FIG. 12c). The liquid crystal layer has the property of a uniaxial birefringent crystal that has different refractive index for the ordinary ($n_o$) and extraordinary ($n_e$) rays. Because it is in liquid form, its optical axis of the liquid layer can be oriented at any direction defined by the alignment layers. In this case, the optical axis of the LC layer is arranged either perpendicular or parallel to the incident plane.

The refractive index of the substrate $n_S$ and the angle of incidence $\theta_0$ satisfy the following conditions respectively:

$$\begin{cases} n_S \approx n_e, & \text{and} \quad n_S > n_o, \quad \text{if} \quad n_e > n_o, \text{ or} \\ n_S \approx n_o, & \text{and} \quad n_S > n_e, \quad \text{if} \quad n_o > n_e, \end{cases} \quad (1)$$

$$\begin{cases} \theta_0 > \theta_C = \sin^{-1}(n_o/n_S), & \text{if} \quad n_e > n_o, \text{ or} \\ \theta_0 > \theta_C = \sin^{-1}(n_e/n_S), & \text{if} \quad n_o > n_e. \end{cases} \quad (2)$$

As shown in FIG. 12a, when a un-polarized light (solid line) is incident at the polarizing element, the e-ray (if $n_e > n_o$) or o-ray (if $n_o > n_e$) is completely transmitted (dashed line) regardless of the angle of incidence. For the other polarized light, o-ray, it is totally reflected (dotted line) because the angle of incidence is larger than the critical angle and the liquid crystal layer is thick enough. The polarizing device works for all wavelengths and angles of incidence as long as Equations (1) and (2) are satisfied. Therefore, it is broadband and wide angle. The extinction ratio is high as well.

It must be stated that the alignment layers could affect the performance of the above polarizing device. To minimize the impact, the refractive index $n_A$ of the alignment layer is selected to be as closed to $n_S$ as possible, or its thicknesses are selected to be small.

At normal or small angles of incidence (FIG. 12b), the transmitted polarized light (dashed line) sees the same refractive index, therefore, light in this polarization is completely transmitted. The polarizing device acts like an anti-reflective coating at normal or small angles of incidence.

One of such polarizing device is designed in accordance with the present invention. The substrate is made of a material having a refractive index 1.589. The liquid crystal layer has $n_o$=1.50, and $n_e$=1.589 and a thickness of 5.0 μm.

Figure 13:
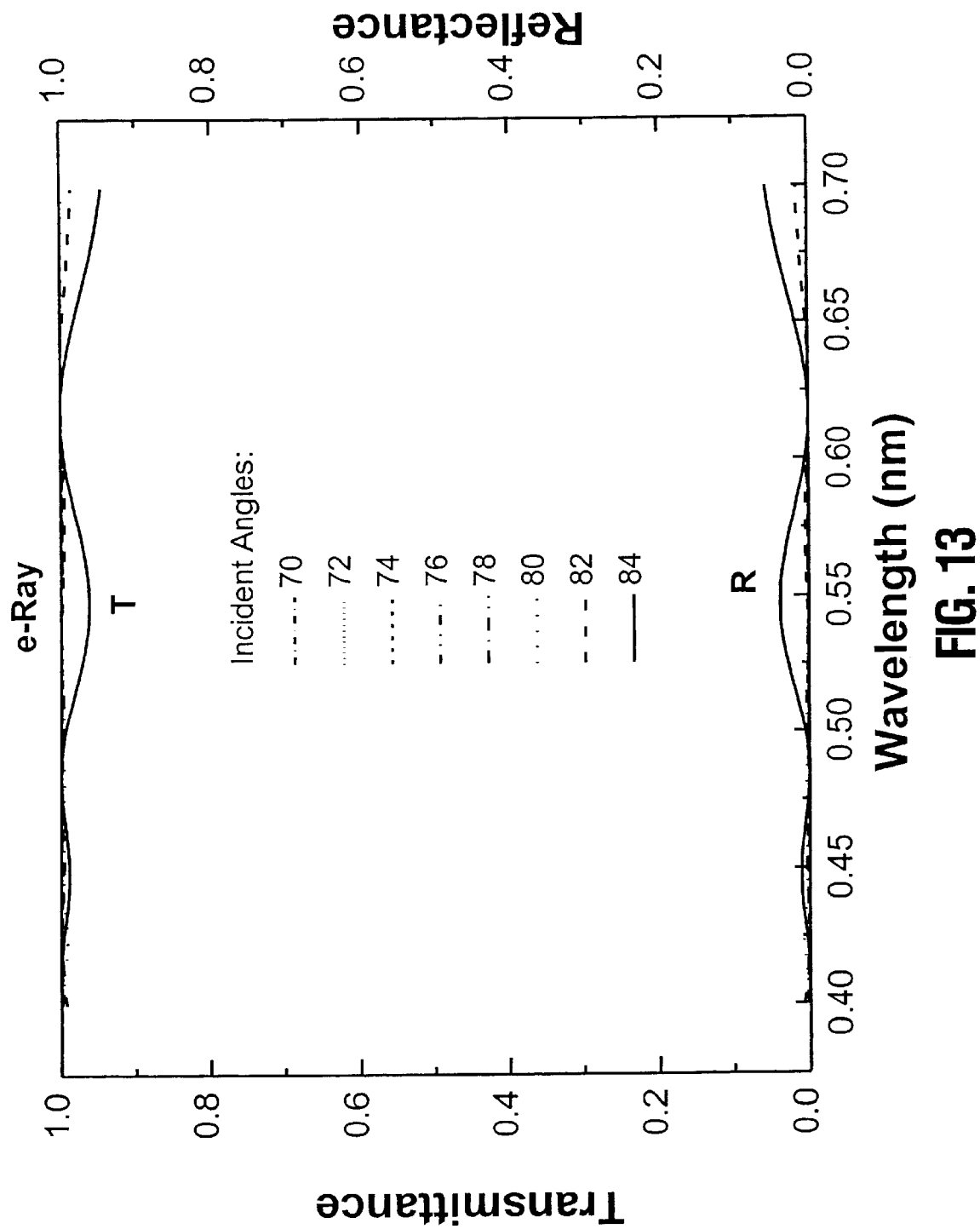
FIG. 13 shows the calculated transmittance and reflectance at different angles of incidence of the third type polarizing device in accordance with the present invention.

The alignment layers 54, 56 are made of materials having refractive index 1.589. FIG. 13 shows the calculated of the transmittance and reflectance of the o- and e-rays at different angles of incidence. Its working angle is between 70°–84° in substrate (±11° in air) in the visible region.

The advantage of using such polarizing device is that it can be made in large quantity at low cost.

Fourth Type of the Polarizing Devices

The fourth of polarizing device that can be used in the present invention is a polarizing beam-splitter based on a stretched plastic film sandwiched between two substrates.

Similar to the liquid crystal polarizing device, a stretched plastic film also has the property of a birefringent crystal (either uniaxial or bi-axial), such that it has different refractive indices for the o- and e-rays. The refractive index difference ($\Delta n = n_e - n_o$) may be smaller.

Figure 14A:
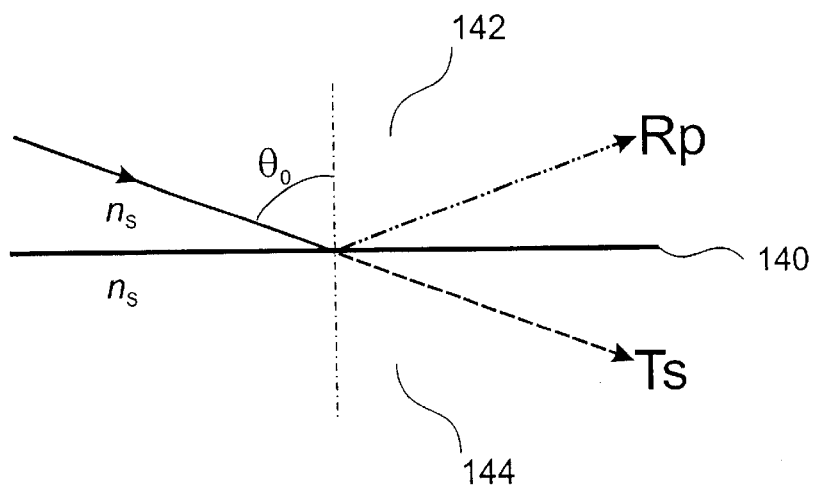
FIG. 14a shows the fourth type polarizing device having a stretched plastic film PBS used in the present invention.
Figure 14B:
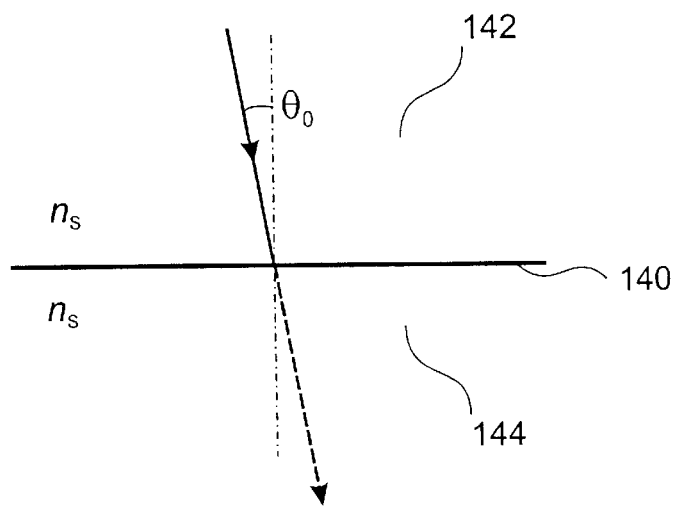
FIG. 14b shows that the fourth type polarizing device is an AR coating at normal or small angles of incidence.
Figure 14C:
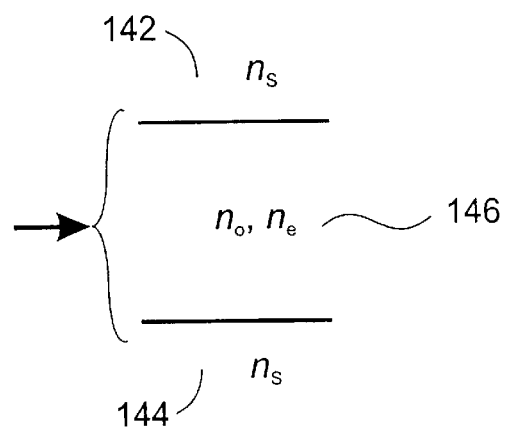
FIG. 14c shows the layer structure of the fourth polarizing device.

A schematic diagram of such polarizing device is shown in FIGS. 14a, 14b and 14c. It consists of two substrates 142 and 144 having refractive index $n_S$, and a polarizing element 140. The polarizing element 140 consists of a stretched plastic film (FIG. 14c) and cementing layers having a refractive index $n_C$. The optical axis of the stretched film 146 is arranged either perpendicular or parallel to the incident plane.

The refractive index of the substrate $n_S$ and the angle of incidence $\theta_0$ satisfy the following conditions respectively:

$$\begin{cases} n_S \approx n_e, \text{ and } n_S > n_o, \text{ if } n_e > n_o, \text{ or} \\ n_S \approx n_o, \text{ and } n_S > n_e, \text{ if } n_o > n_e, \end{cases} \quad (3)$$

$$\begin{cases} \theta_0 > \theta_C = \sin^{-1}(n_o/n_S), \text{ if } n_e > n_o, \text{ or} \\ \theta_0 > \theta_C = \sin^{-1}(n_e/n_S), \text{ if } n_o > n_e. \end{cases} \quad (4)$$

As shown in FIG. 14a, when a un-polarized light (solid line) incident at the polarizing element, the e-ray (if $n_e > n_o$) or o-ray (if $n_o > n_e$) is completely transmitted (dashed line) regardless of the angle of incidence. For the other polarized light, o-ray, it is totally reflected (dotted line) because the angle of incidence is larger than the critical angle and the liquid crystal layer is thick enough. The polarizing device works for all wavelengths and angles of incidence as long as Equations (3) and (4) are satisfied. Therefore, it is broadband and wide angle. The extinction ratio is high as well.

At normal or small angles of incidence (FIG. 14b), the transmitted polarized light (dashed line) sees the same refractive index, therefore, light in this polarization is completely transmitted. The polarizing device acts as an AR coating at normal or small angles of incidence.

The advantage of using such a stretched plastic film polarizing device is that it can be made in large quantity at low cost. The stretched film can be easily glued between to the light pipe and the prism.

Preferred Embodiments of the Polarizing Light Source of the Present Invention

The first preferred embodiment of the polarizing light source is shown in FIG. 1b, which has been described before.

Figure 15:
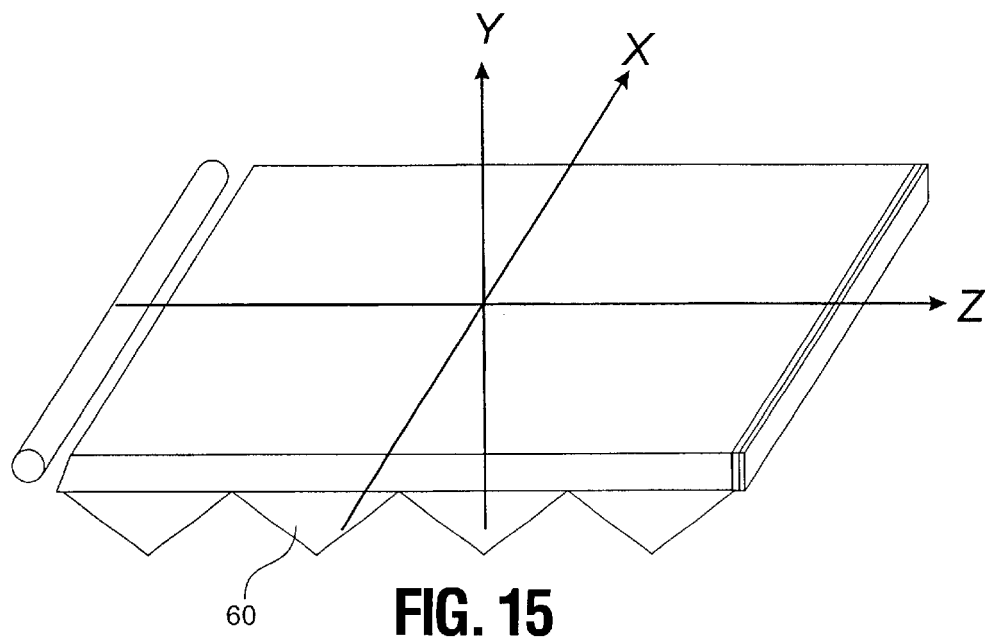
FIG. 15 is a three-dimensional view of the second embodiment of the polarizing source system having an array of prisms.

The second preferred embodiment of the polarizing light source is shown in FIG. 15. Instead of using a single prism, a prism arrays 60 is used.

Figure 16:
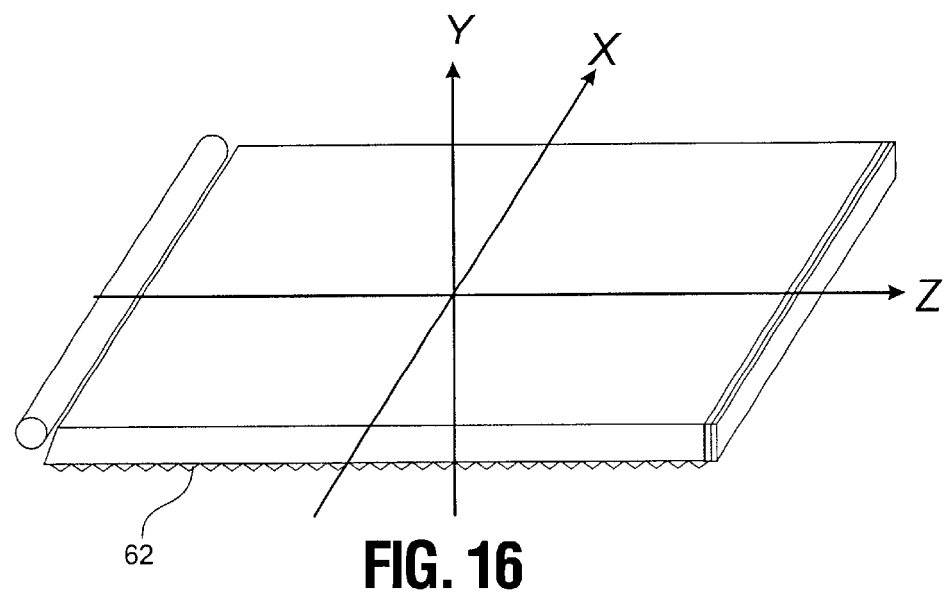
FIG. 16 is a three-dimensional view of the third embodiment of the polarizing source system having an micro-prism sheet.

The third preferred embodiment of the polarizing light source is shown in FIG. 16. Instead of using a prism arrays, a micro prism sheet 62 is used.

The most important properties of the polarizing light source system are the optical efficiency, the extinction ratio, the area, angular and colour uniformity of the exiting light. The performance of the polarizing light source depends on the polarizing device, the polarization converter as well as on the geometry of the system. By carefully designing each individual element, a good performance polarizing light source can be obtained. For example, to improve the area uniformity, a partially polarizing device is preferred, which reflects all the first polarized light but transmits partially the second polarized light. In this case, the second polarized light is not completely directed towards the exiting surface of the optical pipe after the first time that it reaches the polarizing device. Instead, some of the second polarization is left and it is then directed towards the optical pipe again along its zigzag path within the optical pipe. As a result, along the whole length of the optical pipe, there is the second polarized light exiting with a reduced intensity from left to right (FIG. 1a). For the converted second polarized light, its intensity is the highest at right and reduces along the optical pipe from right to left. The total output of the second polarized light is the sum of both. Another way to improve the uniformity is to use a specially designed micro-prism sheet that can reflect light differently along the length of the optical pipe.

Therefore, the terms, "polarizing device" and "partially polarizing device" are interchangeable in the present invention.

In all the above embodiments, the polarizing device can be any one of the described. If the first or second type of the polarizing devices is used, the thin film polarizing coating is deposited either on the bottom surface of the optical pipe, or the top side of the prism. The light pipe and the prism are then put together by means of an index matching cement, an index matching liquid, or optical contacting. Alternatively, if plastic light pipe and micro-prism sheets are used, the thin film coating can be deposited onto a thin plastic web and then glued to the light pipe and micro-prism sheet. This can significantly reduce the manufacturing cost.

If the third type of the polarizing device is used, the refractive index of the substrates of the liquid crystal polarizer should match to that of the optical pipe and the prism. Alternatively, the alignment layer can be deposited onto the bottom surface of the optical pipe and the top of the prism, then a liquid crystal layer is filled in and is sealed on the edges. This approach is also very cost-effective.

If the fourth type of the polarizing device is used, the stretched plastic film can be directly glued to the optical pipe and the prism with an index matching cement or liquid. The cost of this approach can be the lowest because no thin film deposition or liquid filling and aligning liquid crystal is required.

Figure 17:
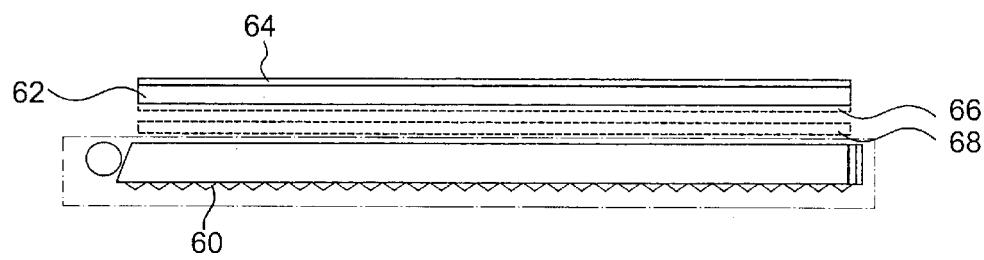
FIG. 17 is a cross-sectional view of the preferred embodiment of a liquid crystal displays having the polarizing source system.

Preferred Embodiment(s) of the Liquid Crystal Displays Having the Polarizing Light Source A preferred embodiment of the direct-view liquid crystal displays is shown in FIG. 17. It consists of a polarizing light source 60 in accordance with the present invention, a liquid crystal display panel 62 having addressing electronics, a polarizer 64 having an optical axis aligned either parallel (normally black) or perpendicular to the pass axis of the polarizing light source (normally white). The polarized light from the polarizing light source first passes through the liquid panel. In the "normally black" case, when no voltage is added to the LC pixels, the polarization of the light is rotated 90° by the twisted liquid cell. The light is therefore blocked by the polarizer 64, these pixels are called "off". When voltages are added to the pixels, the liquid crystal molecules are aligned with the electrical field and the light passes through the cell and it does not see any birefringent effect, therefore, the polarization state of the light is kept unchanged. The light passes the polarizer 64 without any blocking. These pixels are called "on". In the "normally white" case, the principle is the same except that when no voltages are added, the pixels are "on".

In the above embodiment, the polarizing light source converts most of the unpolarized light into polarized light and is highly efficient, therefore, the liquid crystal display is also highly efficient. The polarizing light source acts like the first polarizer. If there is a small contamination of the undesired polarized light, an optional plastic sheet polarizer 68 can always be used to clean up the beam. It only absorbs the undesired light and has little impact on the desired polarization.

Furthermore, if the divergent angle from the polarized light is small and a larger viewing angle is required for the liquid crystal displays, a micro-optics diffuser 68 can be used. This diffuser diffuses the light into a large angular field, however, it preserves the polarization state of the incident light. This is because the diffuser is on micro-lens or micro-structure optics, not scattering which is always de-polarizing light.

We claim:

1. A polarizing light source for providing polarized illumination over a two-dimensional surface, comprising:
    a slab-like light guide having an entrance face at one end thereof for admitting unpolarized light from a linear source, a planar front face for emitting polarized light, a planar back face, and an end face;
    a polarizing device on said back face for reflecting light of a first polarization and transmitting light of a second polarization at non-normal angles of incidence, said reflected light being directed in said light guide to said end face;
    a reflective arrangement under said polarizing device for returning said transmitted second polarized light to said light guide in a direction substantially normal to said polarizing device such that it passes unaffected through said polarizing device for exit through said front face; and
    a polarization converter on said end face for changing the polarization of said reflected light of said first polarization into light of said second polarization and directing it into said reflective arrangement through said polarizing device as light of said second polarization for return to said light guide through said polarizing device in a direction substantially normal to said polarizing device such that it passes unaffected through said polarizing device from said reflective arrangement for exit through said front face.

2. A polarizing light source as claimed in claim 1, wherein said entrance face is angled to facilitate the admission of rays from said light source that strike said back face at non-normal angles of incidence.

3. A polarizing light source as claimed in claim 2, wherein said front and back faces are parallel, and said end face is perpendicular to said front and back faces.

4. A polarizing light source as claimed in claim 2, wherein said reflected light striking said front face is reflected by total internal reflection toward said end face.

5. A polarizing light source as claimed in claim 1, wherein said polarization converter comprises a quarterwave plate and a mirror for reflecting the light back into said light guide.

6. A polarizing light source as claimed in claim 1, wherein said reflective arrangement comprises a prism arrangement and said polarizing device is sandwiched between said prism arrangement and said light guide.

7. A polarizing light source as claimed in claim 6, wherein said prism arrangement comprises a single prism with facets arranged to direct incident light received directly from said light source and from said end face of said light guide up through said polarizing device so as to emerge substantially normal to said front face.

8. A polarizing light source as claimed in claim 6, wherein said prism arrangement comprises an array of prisms with facets arranged to direct incident light received from the directions of said light source and said end face of said light guide up through said polarizing device so as to emerge substantially normal to said front face.

9. A polarizing light source as claimed in claim 6, wherein said prism arrangement comprises a microprismatic sheet with facets arranged to direct incident light from the directions of said light source and said end face of said light guide up through said polarizing device so as to emerge substantially normal to said front face.

10. A polarizing light source as claimed in claim 1, wherein said polarizing device comprises a thin film structure employing interference and frustrated total internal reflection to separate said first and second polarizations.

11. A polarizing light source as claimed in claim 1, wherein said polarizing device is a metal-dielectric thin film structure employing interference to separate said first and second polarizations.

12. A polarizing light source as claimed in claim 1, wherein said polarizing device employs a liquid crystal layer with different refractive indices for ordinary and extraordinary rays.

13. A polarizing light source as claimed in claim 1, wherein said polarizing device employs a stretched thin plastic film having a birefringent property.

14. A method of providing polarized illumination over a two-dimensional surface, comprising the steps of:
    directing light from a linear source through an entrance face into a slab-like light guide having a planar front face for emitting polarized light, a planar back face, and an end face;
    directing said light in said light guide at non-normal angles of incidence to a polarizing device on said back face for reflecting light of a first polarization and transmitting light of a second polarization such that said reflected light is directed in said light guide to said end face;
    returning said transmitted light to said light guide in a direction substantially normal to said polarizing device such that it passes unaffected through said polarizing device for exit through said front face; and
    changing the polarization of said reflected light of said first polarization striking said end face and directing the light with changed polarization through said polarizing device at a non-normal angle of incidence for return into said light guide through said polarizing device in a direction substantially normal to said polarizing device such that said light with changed polarization passes unaffected through said polarizing device for exit through said front face.

15. A method as claimed in claim 14, wherein said incident light is directed into said light guide at an angle of incidence such reflected light is confined internally in said light guide by total internal reflection until it strikes said end face.

16. A method as claimed in claim 15, wherein said front and back faces are substantially parallel, and said end face is perpendicular to said front and back faces.

17. A method as claimed in claim 14, wherein the light leaving the light guide through said polarizing device is reflected back in a direction normal thereto by a prism arrangement.

18. A method as claimed in claim 14, wherein said light is generated by a fluorescent tube.

19. A method as claimed in claim 14, wherein said light is generated by a linear LED array.

20. A method as claimed in claim 14, wherein the light source comprises a linear light source arranged in a reflector tube with a longitudinal slit through which the light emerges.

21. A liquid crystal display comprising:

an addressable liquid crystal array;

a polarizing layer in front of said liquid crystal array;

a linear light source;

a slab-like light guide having an entrance face at one end thereof for admitting unpolarized light from said linear light source, a planar front face for emitting polarized light toward said addressable liquid crystal array, a planar back face, and an end face;

a polarizing device on said back face for reflecting light of a first polarization and transmitting light of a second polarization at non-normal angles of incidence, said reflected light being directed in said light guide to said end face;

a reflective arrangement under said polarizing device for returning said transmitted light to said light guide in a direction substantially normal to said polarizing device such that it passes unaffected through said polarizing device for exit through said front face toward said addressable liquid crystal array; and a polarization converter on said end face for changing the polarization of said reflected light and directing it into said reflective arrangement through said polarizing device as light of said second polarization for return to said light guide through said polarizing device in a direction substantially normal to said polarizing device such that it passes unaffected through said polarizing device from said reflective arrangement for exit through said front face addressable liquid crystal array.

22. A liquid crystal display as claimed in claim 21, wherein said reflective arrangement comprises a prism arrangement under said polarizing device.

23. A liquid crystal display as claimed in claim 21, wherein said prism arrangement is a microprismatic sheet.

24. A liquid crystal display as claimed in claim 21, wherein said polarization converter comprises a mirror and quarterwave plate.

25. A liquid crystal display as claimed in claim 21, wherein said front and back faces of said light guide are parallel, said end face is perpendicular to said front and back faces, and said entrance face is angled so as to facilitate the admission of light at non-normal angles of incidence onto said back face.

26. A liquid crystal display as claimed in claim 21, wherein said linear light source is located in front of a curved reflector adjacent said entrance face.

27. A liquid crystal display as claimed in claim 21, wherein said polarizing device comprises a thin film structure employing interference and frustrated total internal reflection to separate said first and second polarizations.

28. A polarizing light source as claimed in claim 21, wherein said polarizing device is a metal-dielectric thin film polarizing structure employing interference to separate said first and second polarizations.

29. A polarizing light source as claimed in claim 21, wherein said polarizing device employs a liquid crystal layer with different refractive indices for ordinary and extraordinary rays.

30. A polarizing light source as claimed in claim 21, wherein said polarizing device employs a stretched thin plastic film having a birefringent property.

31. A polarizing light source for providing polarized illumination, comprising:

a light guide having an entrance face at one end thereof for admitting unpolarized light, a planar front face for emitting polarized light, a planar back face, and an end face;

a polarizing device on said back face for reflecting light of a first polarization and transmitting light of a second polarization at non-normal angles of incidence, said reflected light being directed in said light guide to said end face;

a reflective arrangement under said polarizing device for returning said transmitted second polarized light to said light guide in a direction substantially normal to said polarizing device such that it passes unaffected through said polarizing device for exit through said front face; and a polarization converter on said end face for changing the polarization of said reflected light of said first polarization into light of said second polarization and directing it into said reflective arrangement through said polarizing device as light of said second polarization for return to said light guide through said polarizing device in a direction substantially normal to said polarizing device such that it passes unaffected through said polarizing device from said reflective arrangement for exit through said front face.

* * * * *